(12) United States Patent
Huang et al.

(10) Patent No.: US 8,537,728 B2
(45) Date of Patent: Sep. 17, 2013

(54) COMMUNICATION APPARATUS WITH ECHO CANCELLATION AND METHOD THEREOF

(75) Inventors: Liang-Wei Huang, Taipei (TW); Ting-Fa Yu, Yunlin County (TW); Ta-Chin Tseng, Taipei County (TW); Chih-Chi Wang, Taichung County (TW)

(73) Assignee: Realtek Semiconductor Corp., Hsinchu (TW)

( * ) Notice: Subject to any disclaimer, the term of this patent is extended or adjusted under 35 U.S.C. 154(b) by 543 days.

(21) Appl. No.: 12/702,298

(22) Filed: Feb. 9, 2010

(65) Prior Publication Data
US 2010/0208577 A1 Aug. 19, 2010

(30) Foreign Application Priority Data

Feb. 18, 2009 (TW) .............................. 98105090 A

(51) Int. Cl.
*H04B 3/20* (2006.01)
(52) U.S. Cl.
USPC .......................................... 370/286; 375/346
(58) Field of Classification Search
None
See application file for complete search history.

(56) References Cited

U.S. PATENT DOCUMENTS

| | | | | |
|---|---|---|---|---|
| 4,999,830 A | * | 3/1991 | Agazzi | 370/286 |
| 5,319,636 A | * | 6/1994 | Long et al. | 370/291 |
| 6,205,124 B1 | * | 3/2001 | Hamdi | 370/260 |
| 6,215,880 B1 | * | 4/2001 | Hasegawa | 381/66 |
| 6,888,896 B1 | * | 5/2005 | Joffe et al. | 375/258 |
| 6,980,644 B1 | * | 12/2005 | Sallaway et al. | 379/391 |
| 7,009,945 B1 | * | 3/2006 | Tang et al. | 370/286 |
| 7,187,719 B2 | * | 3/2007 | Zhang | 375/261 |
| 7,251,213 B2 | * | 7/2007 | Chen et al. | 370/201 |
| 7,254,198 B1 | | 8/2007 | Manickam et al. | |
| 7,333,603 B1 | | 2/2008 | Sallaway et al. | |
| 7,720,015 B2 | * | 5/2010 | Gupta et al. | 370/286 |
| 7,756,228 B1 | * | 7/2010 | Manickam et al. | 375/350 |

(Continued)

FOREIGN PATENT DOCUMENTS

| | | |
|---|---|---|
| CN | 101291152 A | 10/2008 |
| TW | 507433 | 10/2002 |
| TW | 200828838 | 7/2008 |

OTHER PUBLICATIONS

CN Office Action dated Dec. 18, 2012.

(Continued)

*Primary Examiner* — Hassan Kizou
*Assistant Examiner* — Roberta A Shand
(74) *Attorney, Agent, or Firm* — McClure, Qualey & Rodack, LLP

(57) ABSTRACT

A communication apparatus with echo cancellation includes a transmitter, a receiver, a digital echo cancellation circuit, a parameter control circuit, and an analog echo cancellation circuit. The digital echo cancellation circuit determines an echo estimation component according to a digital output signal, and performs a digital echo cancellation on a digital input signal according to the echo estimation component. The parameter control circuit generates a control signal according to the echo estimation component. The analog echo cancellation circuit includes a first echo cancellation resistor and a second echo cancellation resistor, wherein the resistances of the first echo cancellation resistor and the second echo cancellation resistor are adjusted according to the control signal.

19 Claims, 6 Drawing Sheets

(56) References Cited

U.S. PATENT DOCUMENTS

| | | |
|---|---|---|
| 2002/0101983 A1 | 8/2002 | Lee |
| 2003/0206579 A1* | 11/2003 | Bryant .......................... 375/219 |
| 2006/0098808 A1* | 5/2006 | Marchok et al. ......... 379/406.02 |
| 2008/0151787 A1 | 6/2008 | Lin et al. |
| 2008/0253489 A1 | 10/2008 | Huang |
| 2010/0022282 A1* | 1/2010 | Piket et al. ................. 455/569.2 |

OTHER PUBLICATIONS

CN Office Action dated Nov. 28, 2012.
English Abstract translation of TW200828838 (Published Jul. 1, 2008).
English Abstract translation of TW507433 (Published Oct. 21, 2002).
English Abstract translation of CN101291152 (Published Oct. 22, 2008).

* cited by examiner

COMMUNICATION APPARATUS WITH ECHO CANCELLATION AND METHOD THEREOF

BACKGROUND OF THE INVENTION

1. Field of the Invention

The present invention relates to a communication apparatus, and more particularly, to a communication apparatus with echo cancellation.

2. Description of the Prior Art

A full duplex communication of an Ethernet network is accomplished by four unshielded twisted pairs (UTP). Thus, a transport port can have four channels. For the most part, the transmitted signals of a channel, (i.e. an unshielded twisted pair), at its transmitter are interfered with by an Echo formed at its receiver, and the transmitted signals of the transmitter are also interfered with by near-end cross talk (NEXT) formed at the other receivers. When processing digital signals of the receivers, the interference must be eliminated.

A conventional technology has already been disclosed in U.S. Pat. No. 7,333,603. In this conventional technology, it adjusts resistors and capacitors by using error information of a data slicer. Since the signal processed by the data slicer gathers all the error information together, the signal must be first converted before using it. That is, the signal outputted by the data slicer blends too much noise and error and it is too difficult to be used, which may result in distortions easily. Moreover, although the conventional technology can eliminate the echo signal returned to the receiver as far as possible, it cannot control the echo component returned to the receiver to the smallest and cannot control the transmitting power of the transmitter.

SUMMARY OF THE INVENTION

It is one of the objectives of the claimed invention to provide a communication apparatus and a related method to solve the abovementioned problems.

It is one of the objectives of the claimed invention to provide a communication apparatus and a related method for accurately controlling the echo to a minimum and/or for controlling the transmitting power of its transmitter.

According to an exemplary embodiment of the present invention, a communication apparatus is provided. The communication apparatus includes a transmitter, a receiver, a digital echo cancellation circuit, a parameter control circuit, and an analog echo cancellation circuit. The transmitter converts a digital output signal into an analog output signal and transmits the analog output signal. The receiver receives an analog input signal and converts the analog input signal into a digital input signal. The digital echo cancellation circuit determines an echo estimation component according to the digital output signal and performs a digital echo cancellation on the digital input signal according to the echo estimation component. The parameter control circuit is coupled to the digital echo cancellation circuit and generates a control signal according to the echo estimation component. The analog echo cancellation circuit performs an analog echo cancellation on the analog output signal to generate the analog input signal according to the control signal.

According to another exemplary embodiment of the present invention, an echo cancellation method applied to a communication apparatus is provided. The method includes the steps of: converting a digital output signal into an analog output signal, and transmitting the analog output signal; determining an echo estimation component according to the digital output signal; performing a digital echo cancellation on a digital input signal according to the echo estimation component; generating a control signal according to the echo estimation component; performing an analog echo cancellation on the analog output signal to generate an analog input signal according to the control signal; and receiving the analog input signal, and converting the analog input signal into the digital input signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
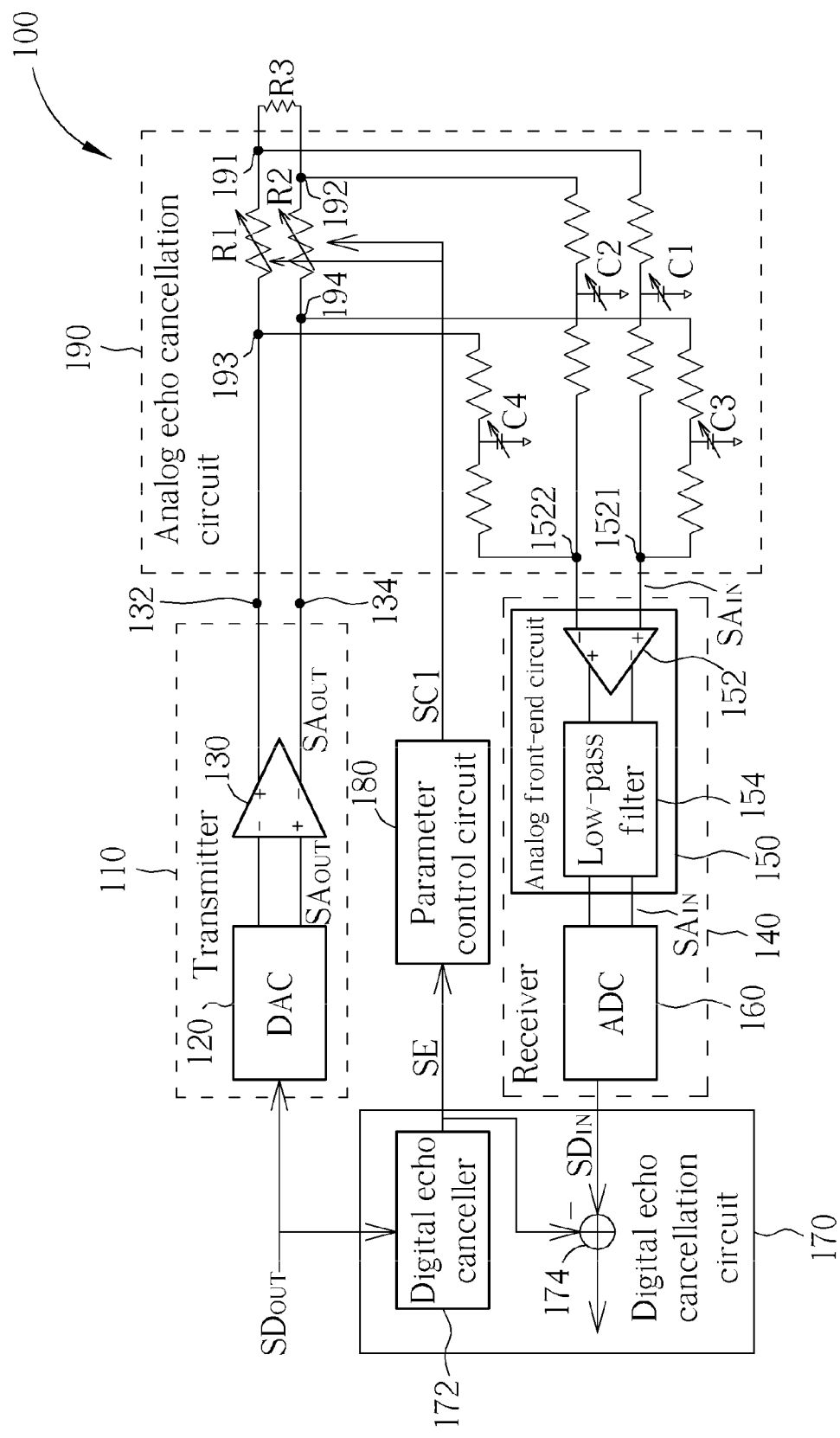
FIG. 1 is a diagram of a communication apparatus according to a first embodiment of the present invention.

FIG. 1 is a diagram of a communication apparatus 100 according to a first embodiment of the present invention. The communication apparatus 100 includes a transmitter 110, a receiver 140, a digital echo cancellation circuit 170, a parameter control circuit 180, and an analog echo cancellation circuit 190.

The transmitter 110 includes a digital-to-analog converter (DAC) 120 and a transmitting circuit 130. The DAC 120 converts a digital output signal $SD_{OUT}$ into an analog output signal $SA_{OUT}$ (being a pair of differential signals), and the transmitting circuit 130 transmits the analog output signal $SA_{OUT}$. The receiver 140 includes an analog front-end circuit 150 and an analog-to-digital converter (ADC) 160, wherein the analog front-end circuit 150 further consists of an auto-gain controller (AGC) 152 and a low-pass filter 154. The analog front-end circuit 150 receives an analog input signal $SA_{IN}$ (being a pair of differential signals), and then the ADC 160 converts the analog input signal $SA_{IN}$ into a digital input signal $SD_{IN}$.

The digital echo cancellation circuit 170 includes a digital echo canceller 172 and a subtractor 174. The digital echo canceller 172 determines an echo estimation component SE according to the digital output signal $SD_{OUT}$, and the subtractor 174 then performs a digital echo cancellation on the digital input signal $SD_{IN}$ according to the echo estimation component SE. The parameter control circuit 180 generates a control signal SC1 according to the echo estimation component SE. The analog echo cancellation circuit 190 adjusts an analog echo cancellation performed on the analog output signal $SA_{OUT}$ to generate the analog input signal $SA_{IN}$ according to the control signal SC1. In this embodiment, the analog echo cancellation circuit 190 consists of a first echo cancellation resistor R1 and a second echo cancellation resistor R2, wherein the first echo cancellation resistor R1 is coupled to a first output end 132 of the transmitter 110 and the second echo cancellation resistor R2 is coupled to a second output end 134 of the transmitter 110. The resistances of the first echo cancellation resistor R1 and the second echo cancellation resistor R2 are adjusted according to the control signal SC1 for impedance matching with an external impedance R3, so that the echo component returned back to the receiver 140 can be reduced. The analog echo cancellation circuit 190 further consists of a first echo cancellation capacitor C1, a second echo cancellation capacitor C2, a third echo cancellation capacitor C3, and a fourth echo cancellation capacitor C4, wherein the first echo cancellation capacitor C1 is coupled to a first end 191 of the first echo cancellation resistor R1 and a first input end 1521 of the receiver 140 through resistors, the second echo cancellation capacitor C2 is coupled to a first end 192 of the second echo cancellation resistor R2 and a second input end 1522 of the receiver 140 through resistors, the third echo cancellation capacitor C3 is coupled to a second end 194 of the second echo cancellation resistor R2 and the first input end 1521 of the receiver 140 through resistors, and the fourth echo cancellation capacitor C4 is coupled to a second end 193 of the first echo cancellation resistor R1 and the second input end 1522 of the receiver 140.

The resistances of the first echo cancellation resistor R1 and the second echo cancellation resistor R2 can be adjusted, so that the total echo component returned back to receiver 140 can be reduced. Due to the echo component returned back to receiver 140 being very small, the transmitting power of the transmitter 110 can be accurately controlled.

Please note that, since the echo estimation component SE is directly obtained from the digital echo cancellation circuit 170 and consists of the near-end echo and the far-end echo only, the echo estimation component SE blends with no other noises and errors and it can be simply used.

Figure 2:
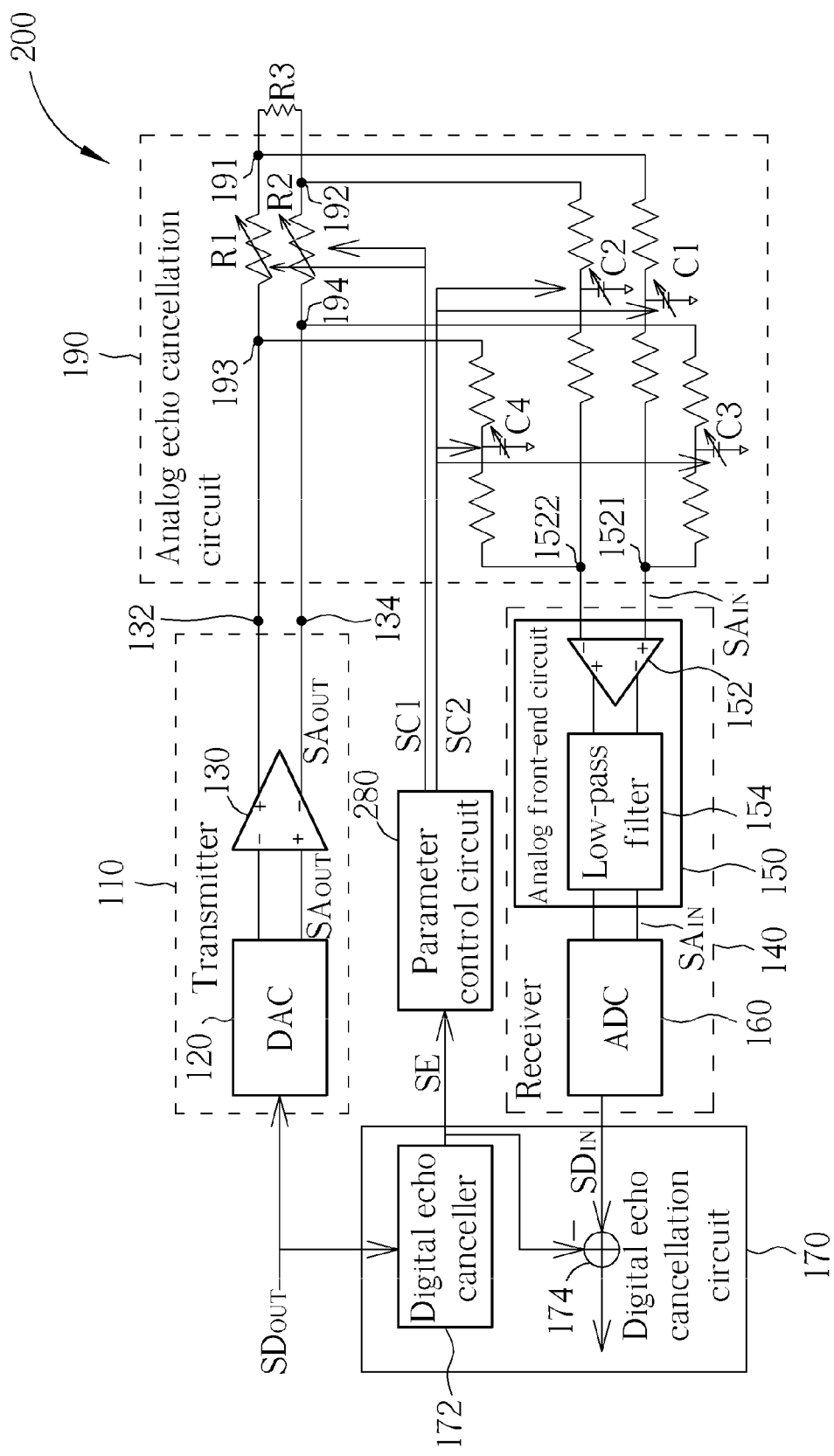
FIG. 2 is a diagram of a communication apparatus according to a second embodiment of the present invention.

The architecture of a communication apparatus 200 shown in FIG. 2 is similar to that of the communication apparatus 100 shown in FIG. 1, and the difference between them is that a parameter control circuit 280 of the communication apparatus 200 further generates another control signal SC2 according to the echo estimation component SE. The capacitances of echo cancellation capacitors C1~C4 are adjusted according to the control signal SC2 to calibrate the phase delays. Therefore, the maximum echo component can be eliminated. Furthermore, a superior performance can be achieved if the echo cancellation capacitors C1~C4 are divided into two paths—one path including the first echo cancellation capacitor C1 and the second echo cancellation capacitor C2 while the other path including the third echo cancellation capacitor C3 and the fourth echo cancellation capacitor C4. But this should not be considered as limitations of the present invention. If only the first echo cancellation capacitor C1 as well as the second echo cancellation capacitor C2 are disposed or only the third echo cancellation capacitor C3 as well as the fourth echo cancellation capacitor C4 are disposed, this also belongs to the scope of the present invention.

Figure 3:
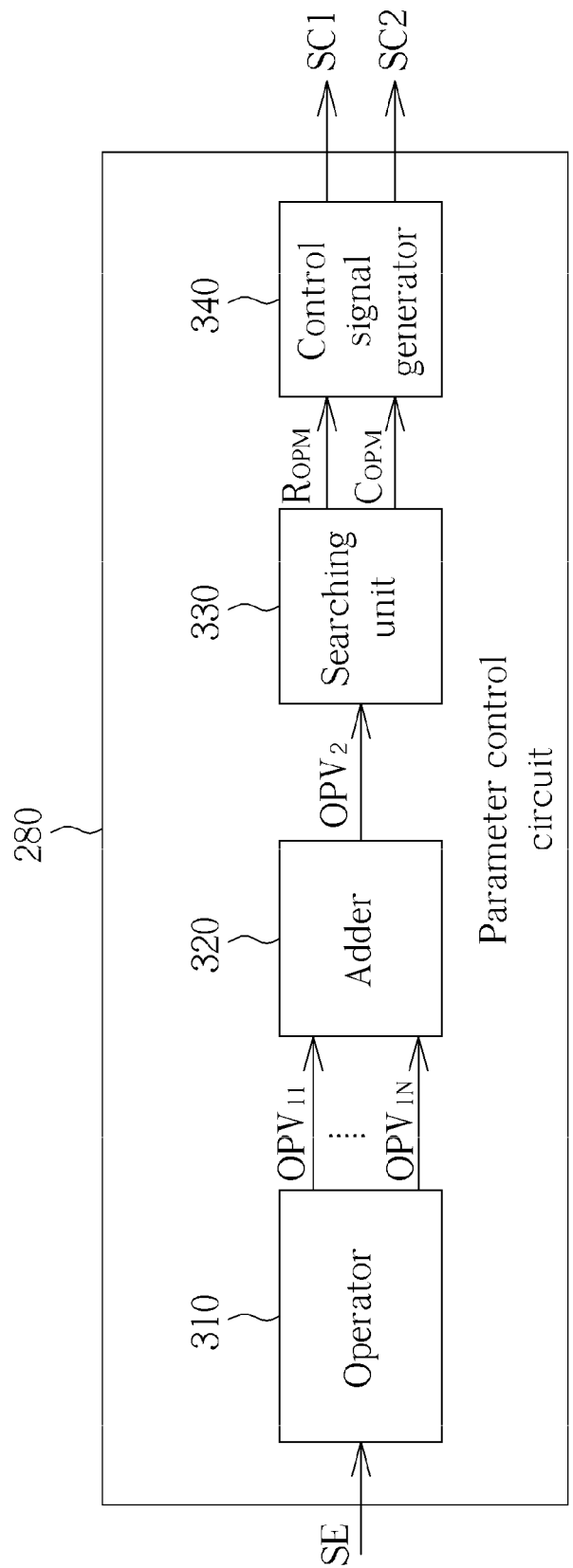
FIG. 3 is a diagram showing an exemplary embodiment of the parameter control circuit shown in FIG. 2.

FIG. 3 is a diagram showing an exemplary embodiment of the parameter control circuit 280 shown in FIG. 2. The parameter control circuit 280 consists of an operator 310, and adder 320, a searching unit 330, and a control signal generator 340. The operator 310 performs a designated operation on a plurality of taps the echo estimation component SE to generate a plurality of first operating values $OPV_{11} \sim OPV_{1N}$. The adder 320 adds the plurality of first operating values $OPV_{11} \sim OPV_{1N}$ up to generate a second operating value $OPV_2$. The searching unit 330 searches an optimum resistance $R_{OPM}$ of the echo cancellation resistors R1~R2 and/or an optimum capacitance $C_{OPM}$ of the echo cancellation capacitors C1~C4 in response to a plurality of second operating values $OPV_2$ corresponding to the different resistances of the echo cancellation resistors R1~R2 and/or the different capacitances of the echo cancellation capacitors C1~C4. In the meanwhile, the control signal generator 340 sets the control signal SC1 according to the optimum resistance $R_{OPM}$ so as to adjust the resistances of the echo cancellation resistors R1~R2 to the optimum resistance $R_{OPM}$, and it sets the control signal SC2 according to the optimum capacitance $C_{OPM}$ so as to adjust the capacitances of the echo cancellation capacitors C1~C4 to the optimum capacitance $C_{OPM}$.

The operator 310 can be an absolute value operator or a square operator, or can be operators of other types. Hence, the operator 310 can perform an absolute value operation (or a square operation) on the plurality of taps (e.g. N taps) of the echo estimation component SE to generate the plurality of first operating values $OPV_{11} \sim OPV_{1N}$. In addition, the second operating value $OPV_2$ can be expressed by the following equation:

$$OPV_2 = OPV_{11} + OPV_{12} + \ldots + OPV_{1N} \qquad (1).$$

The searching unit 330 has various kinds of searching manners. For example, when the echo cancellation capacitors C1~C4 are maintained at their fixed values, the echo cancellation resistors R1~R2 are set to correspond to a plurality of different resistances. Thus, the adder 320 will generate the corresponding second operating values $OPV_2$. At this time, the searching unit 330 searches the optimum resistance $R_{OPM}$, e.g. a minimum value, of the echo cancellation resistors R1~R2 in response to the plurality of second operating values $OPV_2$ corresponding to the echo cancellation resistors R1~R2 with the plurality of different resistances. Finally, the control signal generator 340 sets the control signal SC1 according to the optimum resistance $R_{OPM}$ so as to adjust the resistances of the echo cancellation resistors R1~R2 to the optimum resistance $R_{OPM}$. Another condition is cited as an example, when the echo cancellation capacitors C1~C4 are maintained at their fixed values, the echo cancellation resistors R1~R2 are set to correspond to two different resistances. Thus, the adder 320 will generate two corresponding second operating values $OPV_2$. At this time, the searching unit 330 compares these two corresponding second operating values $OPV_2$ corresponding to the echo cancellation resistors R1~R2 with two different resistances to confirm the adjusting direction until the setting of the optimum resistance $R_{OPM}$ is found.

Similarly, the setting manner of the echo cancellation capacitors C1~C4 can be the same as the aforementioned manner. That is, when the echo cancellation resistors R1~R2 are maintained at their fixed values, the echo cancellation capacitors C1~C4 are set to correspond to a plurality of different capacitances. Thus, the echo cancellation capacitors C1~C4 can be adjusted to the optimum capacitance $C_{OPM}$. Moreover, various modifications to the implementations of the parameter control circuit 180 or 280 may be made without departing from the spirit of the present invention.

Figure 4:
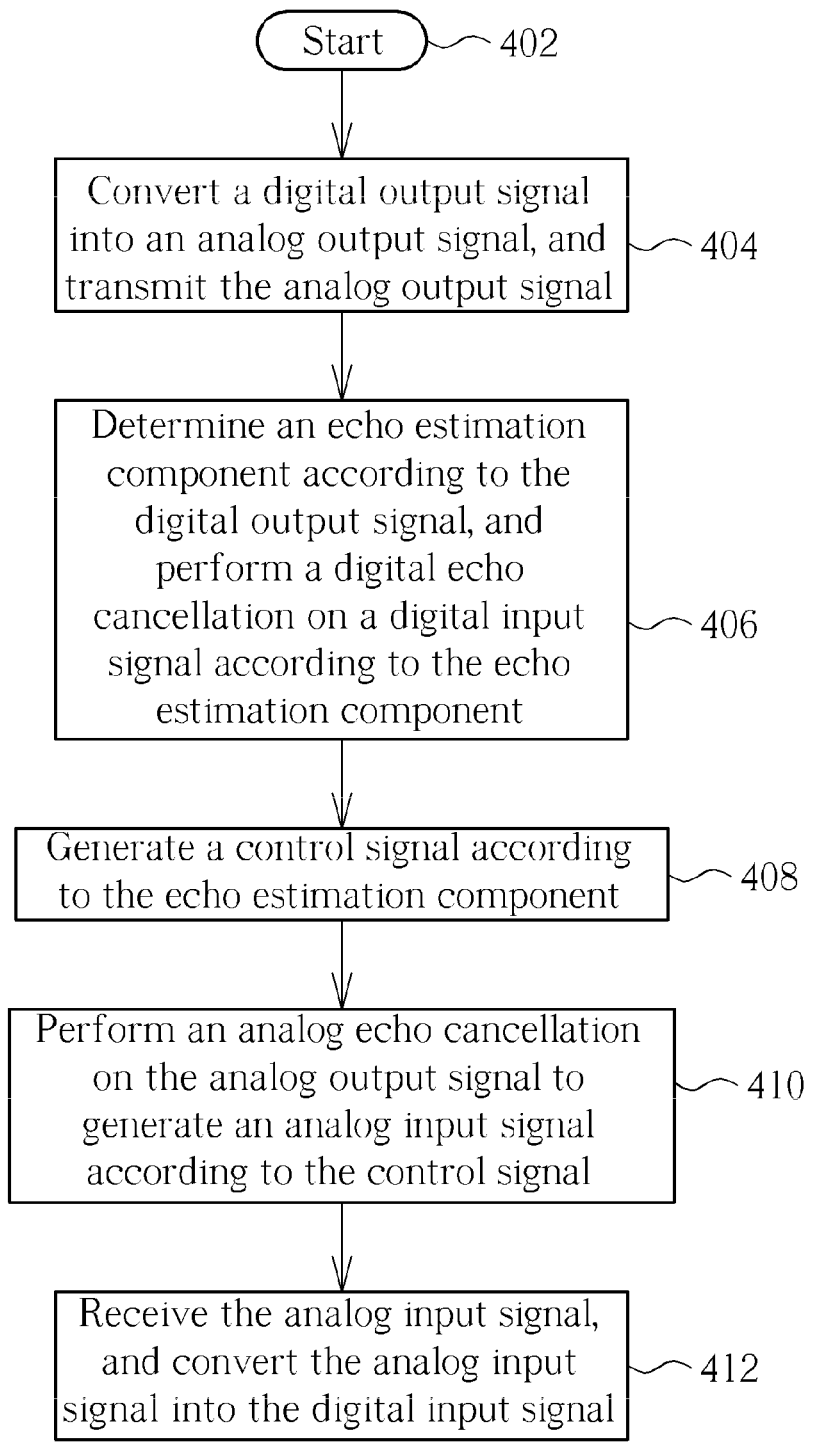
FIG. 4 is a flowchart illustrating an echo cancellation method according to an exemplary embodiment of the present invention.
Figure 5:
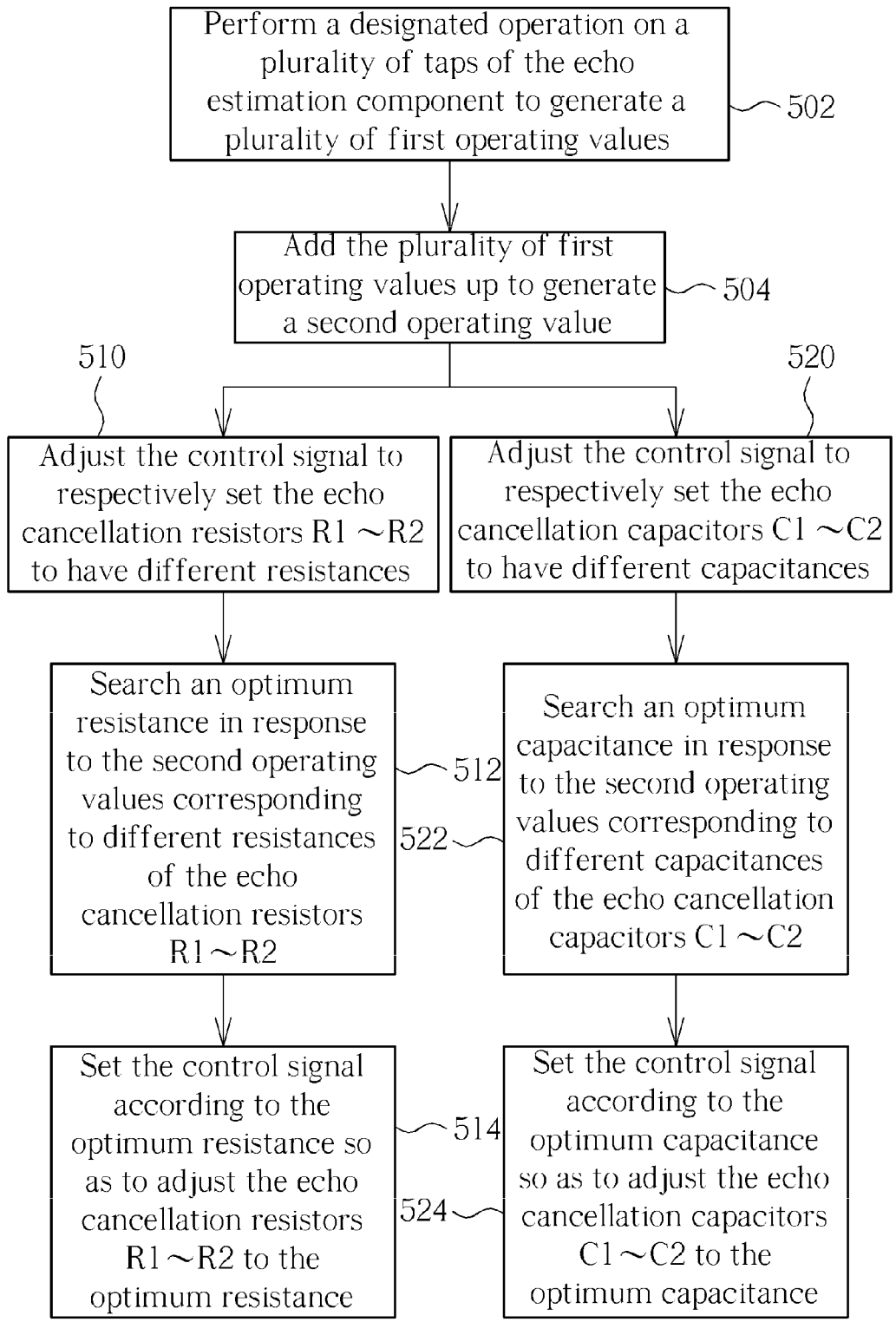
FIG. 5 is a flowchart illustrating the detailed steps of Step 410 shown in FIG. 4.
Figure 6:
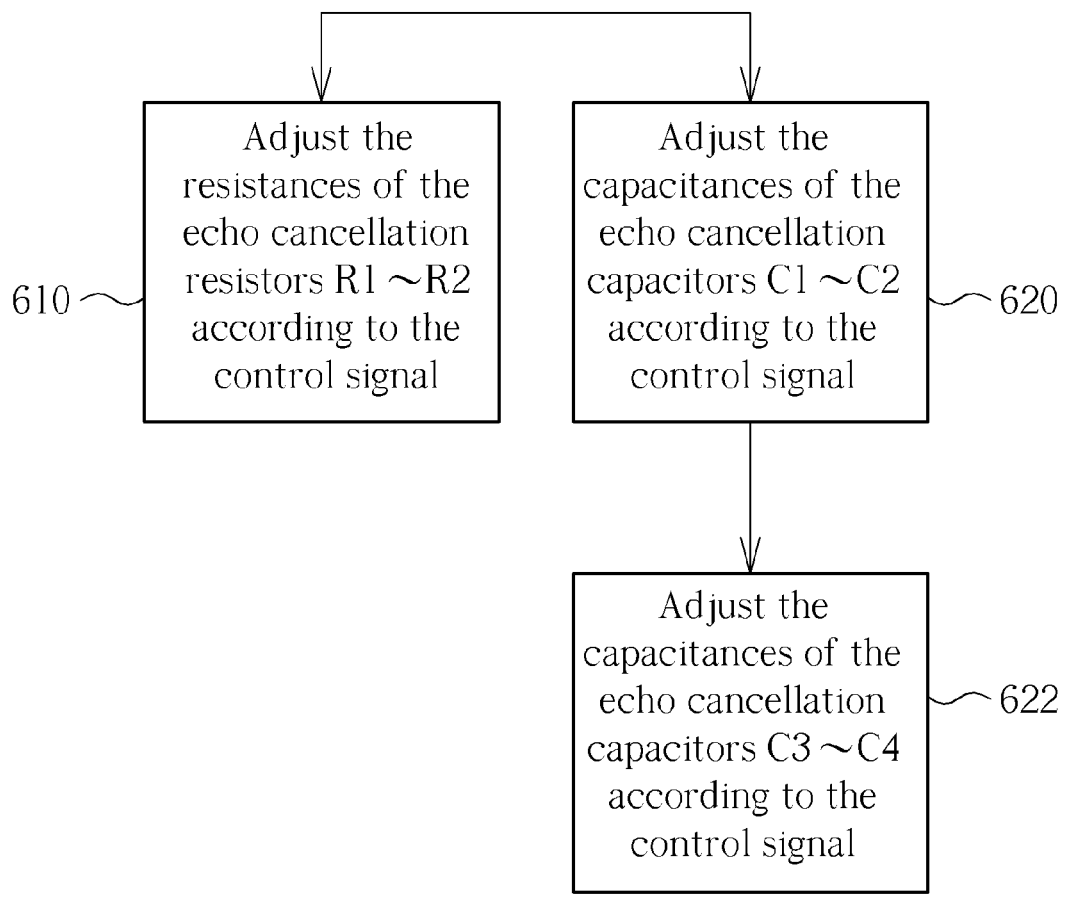
FIG. 6 is a flowchart illustrating the detailed steps of Step 412 shown in FIG. 4.

FIG. 4 is a flowchart illustrating an echo cancellation method according to an exemplary embodiment of the present invention, FIG. 5 is a flowchart illustrating the detailed steps of Step 410 shown in FIG. 4, and FIG. 6 is a flowchart illustrating the detailed steps of Step 412 shown in FIG. 4. Those skilled in the art should find the corresponding steps by reference to the embodiments described in FIG. 1 and FIG. 2, and further description is omitted here for brevity.

As can be understood from the descriptions above, the echo signal is divided into near-end echo and far-end echo in the present invention, wherein the near-end echo can be eliminated according to the embodiments (i.e., the analog circuit) shown in FIG. 1 and FIG. 2 while the residual near-end echo as well as the far-end echo can be reduced by the back-end digital echo cancellation circuit. Since the detailed operations of the back-end digital echo cancellation circuit are commonly known to those skilled in the art, further details are omitted herein for the sake of brevity. In other words, the total echo response (TER) can be obtained by observing the echo component in the digital echo cancellation circuit. Basically, the far-end echo is unchanged, so the variations of the residual near-end echo can be known by adjusting the resistances of the variable resistors and by observing the total echo response (TER). The simplest method is to add up the absolute values of the preceding taps in the converged TER. Since the near-end echo only exists in the preceding taps in the converged TER and the subsequent taps in the converged TER only consists of the far-end echo, a value K can be obtained by adding up the absolute values of the preceding taps in the converged TER. After that, a minimum setting of the value K can be found by adjusting various kinds of settings, which is the required optimum solution.

In summary, by adjusting the echo cancellation resistors and/or the echo cancellation capacitors, the echo component returned back to the receiver can be controlled to the smallest. Due to the echo component returned back to receiver 140 being very small, the transmitting power of the transmitter 110 can be accurately controlled. In addition, since the echo estimation component SE is directly obtained from the digital echo cancellation circuit 170, the echo estimation component SE blends with no other noises and errors and it can be simply used. Furthermore, by searching the optimum resistance $R_{OPM}$ and/or the optimum capacitance $C_{OPM}$ via the searing unit 330, the optimum solution can be found even if different network wires are adopted. Therefore, a superior performance of the analog echo cancellation can be achieved.

Those skilled in the art will readily observe that numerous modifications and alterations of the device and method may be made while retaining the teachings of the invention.

What is claimed is:

1. A communication apparatus, comprising:
   a transmitter, for converting a digital output signal into an analog output signal and for transmitting the analog output signal;
   a receiver, for receiving an analog input signal and converting the analog input signal into a digital input signal;
   a digital echo cancellation circuit, for determining an echo estimation component according to the digital output signal and performing a digital echo cancellation on the digital input signal according to the echo estimation component;
   a parameter control circuit, coupled to the digital echo cancellation circuit, for generating a control signal according to the echo estimation component; and
   an analog echo cancellation circuit, for performing an analog echo cancellation on the analog output signal to generate the analog input signal according to the control signal, wherein the analog echo cancellation circuit comprises echo cancellation resistors adjusted according to the control signal.

2. The communication apparatus of claim 1, wherein the echo cancellation resistors comprise:
   a first echo cancellation resistor, coupled to a first output end of the transmitter;
   a second echo cancellation resistor, coupled to a second output end of the transmitter;
   wherein the analog echo cancellation circuit further comprises:
   a first echo cancellation capacitor, coupled to a first end of the first echo cancellation resistor and a first input end of the receiver; and
   a second echo cancellation capacitor, coupled to a first end of the second echo cancellation resistor and a second input end of the receiver.

3. The communication apparatus of claim 1, wherein the echo cancellation resistors comprise:
   a first echo cancellation resistor, coupled to a first output end of the transmitter;
   a second echo cancellation resistor, coupled to a second output end of the transmitter;
   wherein the analog echo cancellation circuit further comprises:
   a first echo cancellation capacitor, coupled to a first end of the first echo cancellation resistor and a first input end of the receiver; and
   a second echo cancellation capacitor, coupled to a first end of the second echo cancellation resistor and a second input end of the receiver;
   wherein the capacitances of the first echo cancellation capacitor and the second echo cancellation capacitor are adjusted according to the control signal.

4. The communication apparatus of claim 3, further comprising:
   a third echo cancellation capacitor, coupled to a second end of the second echo cancellation resistor and the first input end of the receiver; and
   a fourth echo cancellation capacitor, coupled to a second end of the first echo cancellation resistor and the second input end of the receiver, wherein the capacitances of the third echo cancellation capacitor and the fourth echo cancellation capacitor are adjusted according to the control signal.

5. The communication apparatus of claim 1, wherein the parameter control circuit comprises:
   an operator, for performing a designated operation on the echo estimation component to generate a plurality of first operating values;
   an adder, for adding the first operating values up to generate a second operating value; and
   a control signal generator, for setting the control signal according to the second operating value;
   wherein the control signal is used for adjusting the resistances of the echo cancellation resistors.

6. The communication apparatus of claim 5, wherein the parameter control circuit comprises:
   a searching unit, for searching an optimum value in response to the second operating values corresponding to the different resistances of the echo cancellation resistors;
   wherein the control signal generator generates the control signal according to the optimum value.

7. The communication apparatus of claim 5, wherein the communication apparatus is a full duplex communication apparatus.

8. The communication apparatus of claim 2, wherein the parameter control circuit comprises:
   an operator, for performing a designated operation on the echo estimation component to generate a plurality of first operating values;
   an adder, for adding the first operating values up to generate a second operating value; and
   a control signal generator, for setting the control signal according to the second operating value;

wherein the control signal is used for adjusting at least one of the resistances of the echo cancellation resistors and the capacitances of the echo cancellation capacitors.

9. The communication apparatus of claim 8, wherein the parameter control circuit comprises:
a searching unit, for searching an optimum value in response to the second operating values corresponding to at least one of the different resistances of the echo cancellation resistors and the different capacitances of the echo cancellation capacitors;
wherein the control signal generator generates the control signal according to the optimum value.

10. An echo cancellation method applied to a communication apparatus, comprising:
converting a digital output signal into an analog output signal, and transmitting the analog output signal;
determining an echo estimation component according to the digital output signal;
performing a digital echo cancellation on a digital input signal according to the echo estimation component;
generating a control signal according to the echo estimation component;
performing an analog echo cancellation on the analog output signal to generate an analog input signal according to the control signal, wherein performing the analog echo cancellation on the analog output signal comprises adjusting resistances of a first echo cancellation resistor and a second echo cancellation resistor according to the control signal; and
receiving the analog input signal, and converting the analog input signal into the digital input signal.

11. The method of claim 10, wherein the communication apparatus further comprises a first echo cancellation capacitor and a second echo cancellation capacitor, and the step of performing the analog echo cancellation on the analog output signal to generate the analog input signal according to the control signal comprises:
adjusting the capacitances of the first echo cancellation capacitor and the second echo cancellation capacitor according to the control signal.

12. The method of claim 11, wherein the communication apparatus further comprises a third echo cancellation capacitor and a fourth echo cancellation capacitor, and the step of performing the analog echo cancellation on the analog output signal to generate the analog input signal according to the control signal comprises:
adjusting the capacitances of the third echo cancellation capacitor and the fourth echo cancellation capacitor according to the control signal.

13. The method of claim 11, wherein the step of generating the control signal comprises:
performing a designated operation on a plurality of taps of the echo estimation component to generate a plurality of first operating values;
adding the first operating values up to generate a second operating value; and
setting the control signal according to the second operating value.

14. The method of claim 13, wherein the step of generating the control signal further comprises:
searching an optimum value in response to the second operating values corresponding to at least one of the different resistances of the echo cancellation resistors and the different capacitances of the echo cancellation capacitors; and
generating the control signal according to the optimum value.

15. The method of claim 10, wherein the step of generating the control signal comprises:
performing a designated operation on a plurality of taps of the echo estimation component to generate a plurality of first operating values;
adding the plurality of first operating values up to generate a second operating values; and
setting the control signal according to the second operating value.

16. The method of claim 15, wherein the step of generating the control signal further comprises:
searching an optimum value in response to the second operating values corresponding to the different resistances of the first echo cancellation resistor and the second echo cancellation resistor; and
generating the control signal according to the optimum value.

17. A communication apparatus, comprising:
a transmitter configured to convert a digital output signal into an analog output signal;
a receiver configured to receive an analog input signal and convert the analog input signal into a digital input signal;
a digital echo cancellation circuit configured to determine an echo estimation component according to the digital output signal and perform a digital echo cancellation on the digital input signal according to the echo estimation component;
a parameter control circuit configured to generate a first control signal and a second control signal according to the echo estimation component; and
an analog echo cancellation circuit configured to perform an analog echo cancellation on the analog output signal to generate the analog input signal according to the first and second control signals, wherein the parameter control circuit is further configured to adjust resistance values and capacitance values of the analog echo cancellation circuit according to the first and second control signals.

18. The communication apparatus of claim 17, wherein the parameter control circuit comprises:
an operator configured to perform a designated operation on the echo estimation component to generate a plurality of operating values; and
a control signal generator configured to set the first and second control signals according to the operating values.

19. The communication apparatus of claim 18, wherein the parameter control circuit comprises:
a searching unit configured to search for optimum values in response to the operating values corresponding to the resistance values and the capacitance values of the analog echo cancellation circuit;
wherein the control signal generator generates the first and second control signals according to the optimum values.

* * * * *